United States Patent
Sarkar et al.

(10) Patent No.: US 11,487,299 B2
(45) Date of Patent: Nov. 1, 2022

(54) METHOD AND SYSTEM FOR LOCALIZING AUTONOMOUS GROUND VEHICLES

(71) Applicant: Wipro Limited, Bangalore (IN)

(72) Inventors: Manas Sarkar, Kolkata (IN); Balaji Sunil Kumar, Bengaluru (IN)

(73) Assignee: Wipro Limited, Bangalore (IN)

( * ) Notice: Subject to any disclaimer, the term of this patent is extended or adjusted under 35 U.S.C. 154(b) by 185 days.

(21) Appl. No.: 16/933,015

(22) Filed: Jul. 20, 2020

(65) Prior Publication Data
US 2021/0302994 A1  Sep. 30, 2021

(30) Foreign Application Priority Data
Mar. 31, 2020  (IN) .............................. 202041014442

(51) Int. Cl.
*G05D 1/02* (2020.01)
*G06T 3/00* (2006.01)
*G06V 20/56* (2022.01)
*G06V 20/59* (2022.01)

(52) U.S. Cl.
CPC .......... *G05D 1/0268* (2013.01); *G05D 1/0251* (2013.01); *G06T 3/0037* (2013.01); *G06V 20/56* (2022.01); *G06V 20/59* (2022.01)

(58) Field of Classification Search
CPC .......... G05D 1/0251; G05D 2201/0213; G06V 20/56
See application file for complete search history.

(56) References Cited

U.S. PATENT DOCUMENTS

| 9,476,970 | B1 | 10/2016 | Fairfield et al. |
| 10,430,968 | B2 | 10/2019 | Houts et al. |
| 2018/0192035 | A1* | 7/2018 | Dabeer ................ H04N 13/264 |
| 2018/0210087 | A1* | 7/2018 | Olson .................... G06V 20/58 |
| 2019/0271549 | A1* | 9/2019 | Zhang .................... G06F 16/29 |
| 2021/0004610 | A1* | 1/2021 | Huang .................. G01S 17/931 |

FOREIGN PATENT DOCUMENTS

CN       107167155 A       9/2017

OTHER PUBLICATIONS

Im et al.; Vertical Corner Feature Based Precise Vehicle Localization Using 3D LIDAR in Urban Area; Sensors, 2016; 16(8): 1268; https://doi.org/10.3390/s16081268 (Year: 2016).*

* cited by examiner

*Primary Examiner* — Michael J Zanelli
(74) *Attorney, Agent, or Firm* — Finnegan, Henderson, Farabow, Garrett & Dunner, LLP

(57) ABSTRACT

The disclosure relates to method and system for localizing an autonomous ground vehicle (AGV). In an example, the method includes receiving a line drawing corresponding to a two-dimensional (2D) camera scene captured by a camera mounted on the AGV, determining a plurality of ground-touching corner edges based on a plurality of horizontal edges and a plurality of vertical edges in the line drawing, determining a plurality of three-dimensional (3D) points corresponding to a plurality of 2D points in each of the plurality of ground-touching corner edges based on a mapping relationship between an angular orientation of a ground touching edge of an object in real-world and in camera scene and a set of intrinsic parameters of the camera, generating 2D occupancy data by plotting the plurality of 3D points in a 2D plane, and determining a location of the AGV based on the 2D occupancy data and the mapping relationship.

20 Claims, 10 Drawing Sheets

US 11,487,299 B2

METHOD AND SYSTEM FOR LOCALIZING AUTONOMOUS GROUND VEHICLES

TECHNICAL FIELD

The present disclosure relates generally to autonomous ground vehicles (AGVs), and more particularly to a method and system for localizing AGVs.

BACKGROUND

In recent years, autonomous ground vehicles (AGVs) have gained so much attention over driver-based vehicles and their number is increasing day by day. One of the critical tasks performed by AGVs may be localization process. As will be appreciated, it is important for an AGV to know its exact location on a pre-generated high definition (HD) map to perform navigation. Thus, there is a constant thrive to find a cost-effective and an efficient solution for performing localization of the AGV.

Today, several conventional methodologies, employing various types of perception/vision sensors (for example, light detection and ranging (LiDAR), Laser, radar, or the like) and their combinations, are in use for localization of the AGV. These perception/vision sensors provide distance measure of various objects in surrounding environment. The convention methodologies first determine coordinates of objects (for example, walls, buildings, infrastructures, or the like) in proximity to the AGV. The coordinates of the objects may be then matched with the HD map in an effort to estimate a position of the AGV on the HD map. Though, these perception/vision sensors are effective in providing distance measure of various objects in environment, they are expensive. In contrast, a camera is a low-cost vision sensor, but it is highly difficult to get the distance measurement of an observed environmental object using the camera. Hence, the conventional methodologies, employing low cost camera, for localization may not provide an accurate estimate of the position of the AGV. Further, the conventional methodologies may not be unanimously applicable in any kind of environment.

SUMMARY

In one embodiment, a method of localizing an autonomous ground vehicle (AGV) is disclosed. In one example, the method may include receiving a line drawing corresponding to a two-dimensional (2D) camera scene captured by a camera mounted on the AGV. The method may further include determining a plurality of ground-touching corner edges based on a plurality of horizontal edges and a plurality of vertical edges in the line drawing. The method may further include determining a plurality of 3D points corresponding to a plurality of 2D points in each of the plurality of ground-touching corner edges based on a mapping relationship and a set of intrinsic parameters of the camera. The mapping relationship may be derived by calibrating 2D camera scenes corresponding to different placements of a calibration board in a real-world, Further, the mapping relationship may provide a relationship between an angular orientation of a ground touching edge of an object in real-world and an angular orientation of a corresponding ground touching edge in camera scene, at any given distance. The method may further include generating 2D occupancy data by plotting the plurality of 3D points in a 2D plane. The method may further include determining a location of the AGV based on the 2D occupancy data and the mapping relationship.

In another embodiment, a system for localizing an autonomous ground vehicle (AGV) is disclosed. In one example, the system may include a processor and a memory communicatively coupled to the processor. The memory may store processor-executable instructions, which, on execution, causes the processor to receive a line drawing corresponding to a two-dimensional (2D) camera scene captured by a camera mounted on the AGV. The processor-executable instructions, on execution, may further cause the processor to determine a plurality of ground-touching corner edges based on a plurality of horizontal edges and a plurality of vertical edges in the line drawing. The processor-executable instructions, on execution, may further cause the processor to determine a plurality of 3D points corresponding to a plurality of 2D points in each of the plurality of ground-touching corner edges based on a mapping relationship and a set of intrinsic parameters of the camera. The mapping relationship may be derived by calibrating 2D camera scenes corresponding to different placements of a calibration board in a real-world, Further, the mapping relationship may provide a relationship between an angular orientation of a ground touching edge of an object in real-world and an angular orientation of a corresponding ground touching edge in camera scene, at any given distance. The processor-executable instructions, on execution, may further cause the processor to generate 2D occupancy data by plotting the plurality of 3D points in a 2D plane. The processor-executable instructions, on execution, may further cause the processor to determine a location of the AGV based on the 2D occupancy data and the mapping relationship.

In yet another embodiment, a non-transitory computer-readable medium storing computer-executable instruction for localizing an autonomous ground vehicle (AGV) is disclosed. In one example, the stored instructions, when executed by a processor, may cause the processor to perform operations including receiving a line drawing corresponding to a two-dimensional (2D) camera scene captured by a camera mounted on the AGV. The operations may further include determining a plurality of ground-touching corner edges based on a plurality of horizontal edges and a plurality of vertical edges in the line drawing. The operations may further include determining a plurality of 3D points corresponding to a plurality of 2D points in each of the plurality of ground-touching corner edges based on a mapping relationship and a set of intrinsic parameters of the camera. The mapping relationship may be derived by calibrating 2D camera scenes corresponding to different placements of a calibration board in a real-world, Further, the mapping relationship may provide a relationship between an angular orientation of a ground touching edge of an object in real-world and an angular orientation of a corresponding ground touching edge in camera scene, at any given distance. The operations may further include generating 2D occupancy data by plotting the plurality of 3D points in a 2D plane. The operations may further include determining a location of the AGV based on the 2D occupancy data and the mapping relationship.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
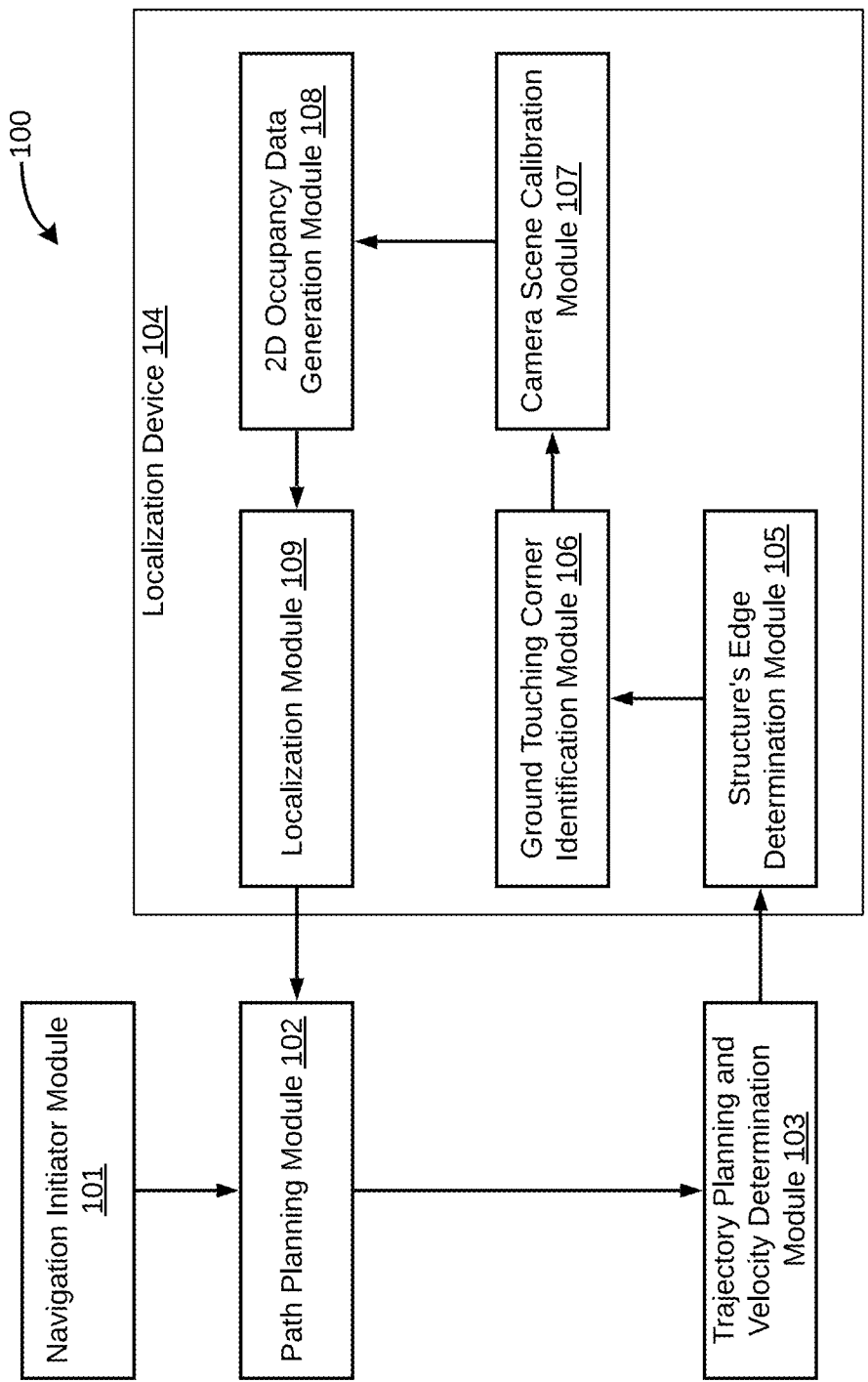
FIG. 1 is a functional block diagram of an exemplary system for localizing an autonomous ground vehicles (AGV), in accordance with some embodiments of the present disclosure.

Referring now to FIG. 1, an exemplary system 100 for localizing autonomous ground vehicles (AGV) is illustrated, in accordance with some embodiments of the present disclosure. The system 100 includes a navigation initiator module (NIM) 101, a path planning module (PPM) 102, and a trajectory planning and velocity determination module (TP&VDM) 103. In particular, the system further includes a localization device 104 for performing localization of the AGV, in accordance with some embodiments of the present disclosure. The localization device 104 further includes a structure's edge determination module (SEDM) 105, a ground touching corner identification module (GTCIM) 106, a camera scene calibration module (CSCM) 107, a two-dimensional (2D) occupancy data generation module (2D-ODGM)108, and a localization module (LM) 109.

The NIM 101 may be configured to initiate a process of navigation from path planning to velocity generation for autonomously driving the AGV from a source location to a destination location. In particular, the NIM 101 may act as a user interface (UI) layer for the system 100. The NIM 101 may display a geographic map to a user through a graphical user interface (GUI). In the map, the user may be able to see a current location of the AGV at some point (i.e., the source location) as well as other locations at other points. There may be a provision for the user to touch any point (on drivable road area only) on the map for selecting the destination location. Further, the NIM 101 may be connected to the PPM 102 and may provide the source and the destination location to the PPM 102 for path planning and to initiate navigation.

The PPM 102 may generate a base path (also referred to as global path) from the current vehicle location to the destination location for the AGV's navigation. The PPM 102 may employ a shortest path algorithm or any other path planning algorithm so as to generate the base path on a 2D occupancy grid map. It should be noted, for motion, the AGV requires some plan for a just ahead segment or portion of the base/global path (say, about ten to fifteen meters ahead starting from a current location on the global path. This segment/portion of the base/global path may be referred to as trajectory path (also referred to as local path). The PPM 102 may be operatively interconnected between the NIM 101 and TP&VDM 103.

The TP&VDM 103 may generate a suitable trajectory plan for the trajectory path based on current environmental data and vehicle speed. The TP&VDM 103 may further determine a projected velocity as per the generated trajectory plan. In particular, the TP&VDM 103 may generate a trajectory-velocity plan for the AGV. The trajectory-velocity plan may be then provided to navigation module (NM) (not shown) for actual velocity generation. The NM may generate a realistic velocity based on previous moment velocity and the trajectory-velocity plan. It should be noted that, during trajectory planning, improved trajectory suggestions may be received, based on vehicle's current velocity and global plan segment ahead (by a curvature data calculation). Further, it should be noted that the velocity generation may be executed in a certain frequency (say, 100 ms) and applied to a wheelbase of the AGV. Further, a next moment velocity may be observed for further realistic velocity calculation.

The SEDM 105 of the localization device 104 may receive camera scenes captured by a camera mounted on the AGV and subsequently process the camera scenes for detecting a plurality of edges in the camera scenes. For example, the camera scenes may include roadside infrastructures such as edges of building, walls, and foot path. A processed image may only comprise a line drawing for the camera scenes including the plurality of edges. It should be noted that the plurality of edges in the line drawing of the camera scenes comprises a plurality of horizontal edges and a plurality of vertical edges. The SEDM 105 is further communicatively coupled to the GTCIM 106 to transmit the line drawing of the camera scenes.

The GTCIM 106 may be configured to receive the line drawing from the SEDM 105. Subsequently, the GTCIM 106 may analyse the edges only in the line drawing to determine a plurality of ground touching corner edges from a plurality of corner edges, based on the plurality of horizontal edges and the plurality of vertical edges in the line drawing. Image pixels of a vertical column indicating an edge may be explored for their ground proximity. And then, associated horizontal pixels (slightly upward) may be kept as ground touching points. Further, the GTCIM 106 may be coupled to the CSCM 107

The CSCM 107 may map a relationship between camera scene points to the ground touching corner edges in real world (say, 3D plane). A calibration board may be employed by the CSCM 107 to perform camera scene calibration so as to determine the mapping relationship. In some embodiments, the calibration board may be placed perpendicularly on ground at a plurality of distances and different orientations. Then a set of observations may be made so as to determine a relationship between an angular orientation of a ground touching edge of an object in real-world and an angular orientation of a corresponding ground touching edge in camera scene, for a number of distances. In particular, a mathematical formula may be derived corresponding to the relationship. The mathematical formula may be used along with camera parameter standard equations for 3D point to 2D point transformation, in order to map 2D coordinates of pixels in the camera scenes (that are aligned to one of a ground touching line at some orientation) to ground touching three-dimensional (3D) coordinates. The CSCM 107 may be further connected to the 2D-ODGM 108. It should be noted that the CSCM 107 may derive the mapping relationship (i.e., relationship of angular orientation of a ground touching edge of a wall (e.g., perpendicularly placed cardboard) in the real-world and in camera scene) in a factory environment or in a workshop environment. In other words, the CSCM 2017 may derive the mapping relationship prior to the use of mapping relationship for real-time localization.

This 2D-ODGM 108 may be configured to plot real coordinate points (say, three-dimensional points) in a 2D plane for generating a 2D occupancy data in proximity to the AGV. It should be noted that, after processing in GTCIM 106, a runtime camera scene (also referred to as camera image or 2D image) may have multiple series of points as part of ground touching point in pixel context. These series of points may be represented by a straight-line equation to evaluate at least two real coordinate points. Remaining pixel to real coordinate points mapping may be derived as per a pixel to real coordinate mapping rule, based on the mapping relationship derived by the CSCM 107. The 2D-ODGM may be connected to the LM 109 intending to locate the AGV.

The LM 109 may be configured to determine a vehicle location. The vehicle location may be determined based on the 2D occupancy data generated by the 2D-ODGM 108 using a filter technique and map data. In some embodiments, multiple cameras with their separate camera scene calibration may be used to increase data coverage, when a single camera data is not sufficient for localization.

It should be noted that the localization device 104 may be implemented in programmable hardware devices such as programmable gate arrays, programmable array logic, programmable logic devices, or the like. Alternatively, the localization device 104 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for localizing the AGV. For example, the exemplary system 100 and associated localization device 104 may localize the AGV using a single or multiple camera, by the process discussed herein. In particular, as will be appreciated by those of ordinary skill in the art, control logic and/or automated routines for performing the techniques and steps described herein may be implemented by the system 100 and the associated localization device 104 either by hardware, software, or combinations of hardware and software. For example, suitable code may be accessed and executed by the one or more processors on the system 100 and the associated localization device 104 to perform some or all of the techniques described herein. Similarly, application specific integrated circuits (ASICs) configured to perform some or all the processes described herein may be included in the one or more processors on the system 100.

Figure 2:
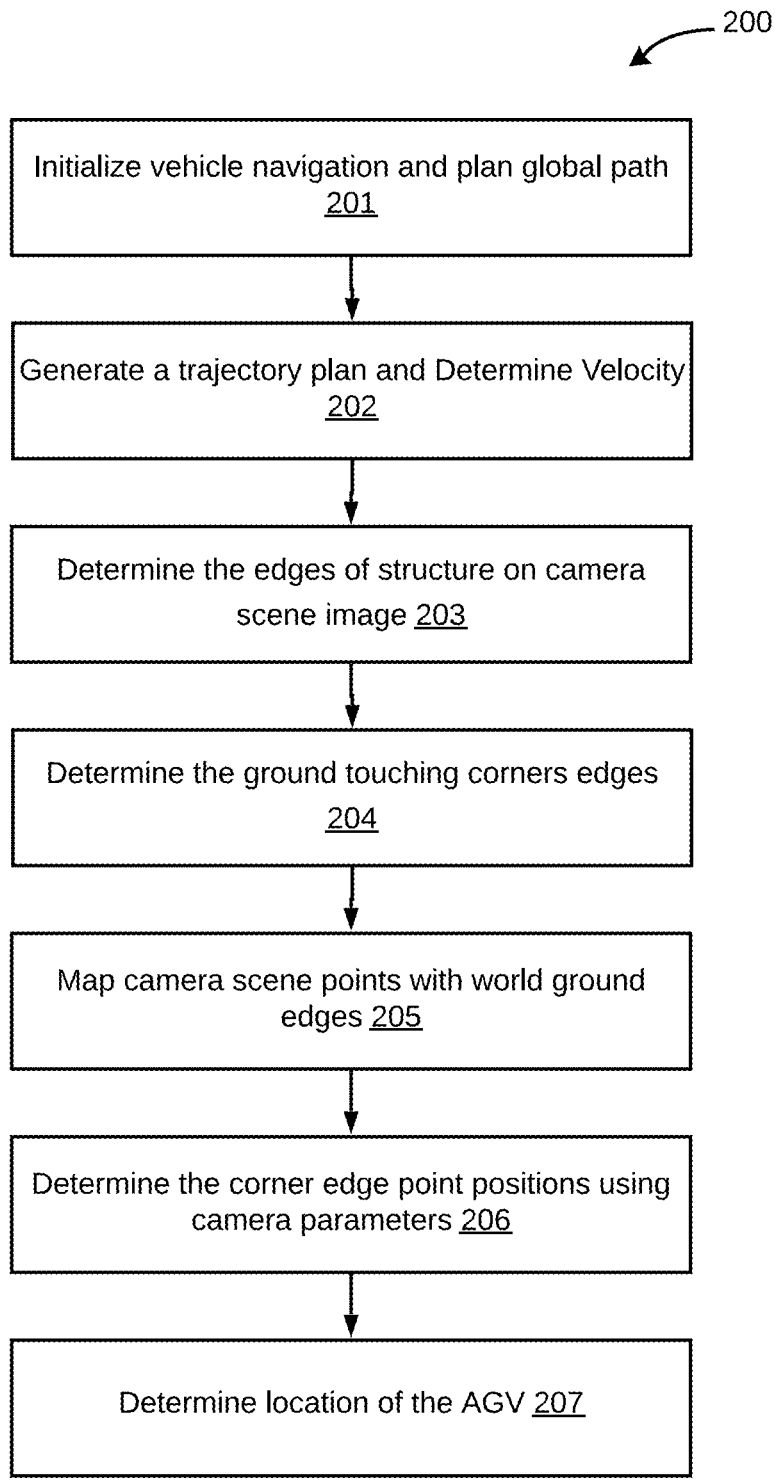
FIG. 2 is a flow diagram of a detailed exemplary process for localizing an AGV, in accordance with some embodiments of the present disclosure.

Referring now to FIG. 2, an exemplary process 200 for localizing the AGV is depicted via a flowchart, in accordance with some embodiments of the present disclosure. All the steps of the process 200 may be performed by various modules/engines of system 100.

At step 201, a vehicle navigation process may be initialized and a global path for navigation may be planned. As already explained in conjunction with the FIG. 1, the NIM 101 and PPM 102 are employed to initiate a navigation process and plan the global path, respectively. In an embodiment, a navigation map may be displayed to a user using a GUI, by the NIM 101. The user is able to see a current location of the vehicle as well as other locations on the navigation map. The user may select any location as a destination location simply by selecting a point (representing a particular location) on the navigation map (by touching a point on the navigation map). Thereafter, the PPM 102 may be initialized to generate a base path for navigation. The base path may be generated from the current or initial location of the vehicle to the selected destination location. The base path may vary with change in the destination location. In other words, the PPM 102 generates different base paths for different destination locations selected by the user. The base path may be generated by employing a shortest path algorithm or any other path planning algorithm on a 2D occupancy grid map. With regards to the base path, a source to destination path plan may be generated.

At step 202, a trajectory plan and velocity may be generated. The generation of trajectory plan and velocity may be executed by the TP&VDM 103. It may be noted that, for motion, the AGV requires some distance on the global path, preferably ten to fifteen meters ahead from a starting point of the global path. The trajectory plan for the distance may be generated based on a current environment data and vehicle speed. Further, the generated trajectory plan may be utilized to generate an actual velocity for the AGV. It should be noted that a realistic velocity based on a previous moment velocity and the projected velocity as per the trajectory plan is generated. When a trajectory is planned, based on current velocity and global plan segment ahead, by a curvature data calculation, improved trajectory suggestions may be received. The velocity may be generated in a certain frequency of hundred milli seconds and subsequently applied to a respective AVG wheelbase. In some embodiments, the velocity may be observed for further realistic velocity calculation.

At step 203, the camera scenes captured by the camera mounted on the AGV may be received and a plurality of corner edges may be identified in a structure associated with the camera scenes. It should be noted that, the camera scenes may be converted to sharp edge mode first to determine the plurality of corner edges. The operation of determining the plurality of corner edges of the structure may be implemented by the SEDM 105. The methodology for determining the corner edges in the camera scenes will be explained in greater detail in conjunction with FIG. 3.

At step 204, ground touching corner edges may be determined. In some embodiments, the determined plurality of corner edges may be analyzed by the GTCIM 106 in order to identify the ground touching corner edges. It should be noted that a set of horizontal edges may be virtually extended away from their respective corner points, till each of the set of horizontal edges touches another vertical or horizontal edge. A corner edge, when a horizontal edge of another corner edge below an associated vertical edge of the corner edge is identified, may be discarded. The methodology for determining the ground touching corner edges will be explained in greater detail in conjunction with FIG. 4.

At step 205, the camera scene points may be mapped with world ground edges. In other words, a mapping relationship between 2D points in the 2D image with three-dimensional (3D) points in a real-world may be determined. In some embodiments, a calibration board may be placed perpendicular to the ground at different distances, along a central line of a camera vertical lens. Also, for each distance the calibration board may be rotated, at different angles. It should be noted that the distance and angle selection may depend upon a user. Here, in the present disclosure a 10×4 meter, full black color, calibration board may be used to prepare a camera scene to real-world mapping data and the dimensions of the calibration board may be varied based on the user requirement. The observed data may be analyzed to derive a mapping relationship. Additionally, in some embodiments the camera may be positioned above the AGV and that may be deemed as positioned on a known location with respect to the AGV. An equation of rotated ground touching line of the calibration board in camera world at a 'D' distance from camera position may be given as per equation (1) below:

$$Z=m*X+D, Y=-H \quad \text{Equation (1)}$$

where, 'H' is height of the camera from the ground, and m=tan (β), and angle 'β' varies from 0 degree to 90 degree. It should be noted that the angle 'β' represents an orientation of a real-world ground touching line or edge of an object (e.g., wall or building or calibration board).

As will be appreciated, a camera scene of the object (e.g., building or calibration board) edge may change along with distance of the object from the camera. Thus, the calibration board may be rotated from 0 degree to 90 degree at different distance, and the data correspondence between camera scenes pixels to real world coordinate may be noted. In other words, at any distance D (any value of Z at which the calibration board has been kept), the angle 'β' may be varied from 0 to 90 and variation of corresponding angle 'α' in the camera scene may be determined. It should be noted that the angle 'α' represents an orientation of ground touching edge or line in the camera scene. Thus, based on the observations and measurements noted for calibration board at different distances and at different angles a graph may be plotted. A mapping relationship between ground touching line orientation in the 2D camera scene (i.e., the angle 'α') and the ground touching line orientation in the real-world (i.e., the angle 'β') may be then determined based on the graph. In some embodiments, the mapping relation may be given as per equation (2) below:

$$\beta = D \times e^{D\alpha} \quad \text{Equation (2)}$$

where, the angle 'α' may vary from a particular degree to 90 degree. From the equation (2), it is observed that there may be an exponential relationship between beta and alpha. Thus, the equation (2) may be derived by placing the calibration board at various distances and by rotating the calibration board by varying the value of the angle 'β'. The methodology for performing camera scene calibration and deriving equation (2) will be explained in greater detail in conjunction with FIGS. 5 and 6A-6C.

At step 206, a corner edge point position may be determined using camera parameters and the mapping relationship. First, as per standard camera equations, the plurality of 3D points is mapped to the 2D points of image or scene plane as per the relation (u, v)=f (X, Y, Z), where (X, Y, Z) represents any world coordinates and (u, v) denotes pixel position on the camera scene. A complete mathematical model describing this transformation may be given as per equation (3) below:

$$p=K[R|t]\times P \quad \text{Standard Equation (3)}$$

where, 'K' is a matrix that comprises the intrinsic parameters of the camera, while variables 'R' and 't' comprises extrinsic parameters of rotation and translation respectively.

The intrinsic parameter matrix may include a focal length 'f' of the camera, (mx, my) the number of pixels per x unit of image coordinates and the number of pixels per y unit of image coordinates respectively, (px, py) the coordinates of a principal point of the image, and (Sx & Sy), the skew of the pixels including deviation from rectangularity. It should be noted that, for high quality cameras, the pixels are usually square, the skew is typically 0, and the principal point may often be approximated by the image origin. In its detailed matrix form, equation (3) may be re-written as equation (4) below:

$$[u|=[f\,0\;Ox|[r11\;r12\;r13\;t1|[X|s|v|=|0\,f\,Oy||r21\;r22\;r23\;t2||Y||1]|001]|r31\;r32\;r33\;t3]|Z] \quad \text{Standard Equation (4)}$$

In equation (4), (u, v) represents image pixel position. Further, fx and fy are the focal lengths of the camera in terms of pixel dimensions in the 'u' and 'v' direction respectively, and 's' is a skew parameter. 'Ox' & 'Oy' are coordinates of the principal point in terms of pixel dimensions. For explanation simplicity, if (X, Y, Z, 1) is considered to be in the camera coordinate frame, then the extrinsic matrix [R|t] need not be considered in the above equation. The projection of 'u' & 'v' on 2D plane may be derived from equation (4), and may be given as per equations (5) and (6) below:

$$u=1/s*f*X/Z+Ox, \text{ where 's' may be } s_x \quad \text{Standard Equation (5)}$$

$$v=1/s*f*Y/Z+Oy, \text{ wherein 's' may be } s_y \quad \text{Standard Equation (6)}$$

Further, a relationship between 'Z' (i.e., real world distance) and 'v' (i.e., pixel position) may be derived based on equation (5). The relationship may be given as per equations (7) and (8) below:

$$Z=f*Y/(s*(v-Oy)) \quad \text{Standard Equation (7)}$$

$$Z=f*Y/(s*(v-Ox)) \quad \text{Standard Equation (8)}$$

The ground touching scene lines may comprise pixels (u, v). After mapping to camera frames, required camera world coordinates may be determined based on the mapping relationship. In other words, a plurality of 3D points corresponding to a plurality of 2D points in each of the plurality of ground-touching corner edges may be determined based on the mapping relationship and intrinsic parameters of the camera. As the positions of ground touching lines are being determined, these points together may prepare the 2D occupancy data of vehicle surrounding. The methodology for generating 3D points from 2D points will be explained in greater detail in conjunction with FIGS. 7A-C.

At step 207, a location of the AGV may be determined. The localization module 109 of the localization device 104 may be configured to determine the location of the AGV by formulating 2D occupancy data in the 2D-ODGM 108 and using it with any filter technique along with map data. As stated above, if single camera data is not sufficient, multiple camera with separate scene calibration may be employed to increase the data coverage. In some embodiments, the 2D occupancy data and the map data in addition to a particle filter localization algorithm may be applied Further, in some embodiments, Monte Carlo Localization algorithm may be used for locating the AGV. The methodology for localizing an AGV using 2D occupancy data will be explained in greater detail in conjunction with FIG. 8.

Figure 3:
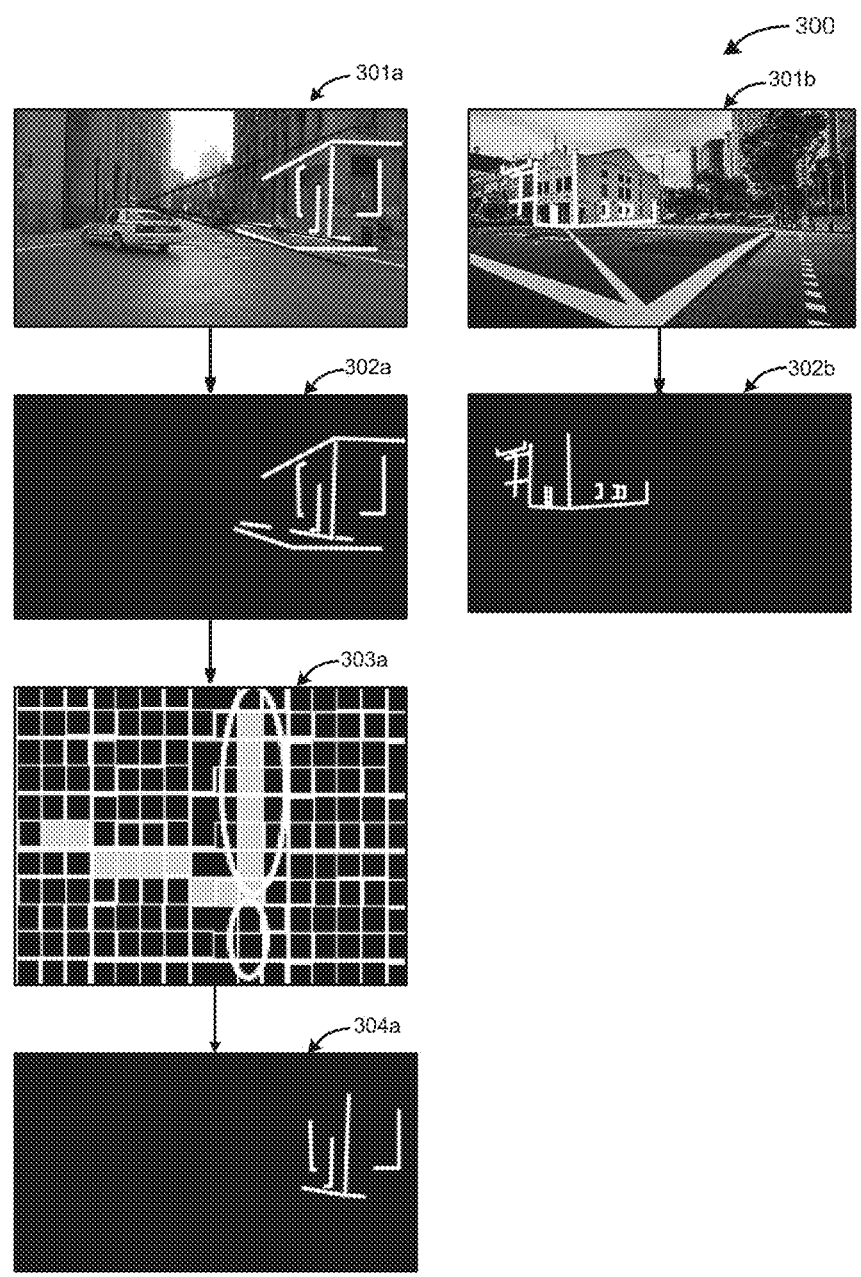
FIG. 3 depicts an exemplary methodology for determining corner edges in camera scenes corresponding to two different infrastructures, in accordance with some embodiments of the present disclosure.

Referring now to FIG. 3, an exemplary methodology 300 for determining corner edges in camera scenes corresponding to two different infrastructures is illustrated, in accordance with some embodiments of the present disclosure. Initially, two-dimensional (2D) images 301a and 301b representing the camera scenes are converted into edge mode or line drawings 302a and 302b. It should be noted that, for each of the 2D images 301a and 301b, the line drawings 302a and 302b comprising a plurality of horizontal and vertical edges may be determined. In the line drawings 302a and 302b only straight-line edges are considered. The line drawing may be obtained by employing any Open Source Computer Vision (OpenCV) algorithm. Thereafter, pixel details for the line drawings 302a and 302b may be determined. The pixel details, for one specific corner of the line drawing 302a are shown in 303a. In 303a white blocks are representing the pixels of the specific corner. Similarly, the pixel details may also be determined for the line drawing 302b (not shown). Thereafter, only corner edges are kept from a plurality of horizontal and vertical edges, and remaining edges may be eliminated from the line drawing 302a based on the respective pixel details as shown in 304a.

Figure 4:
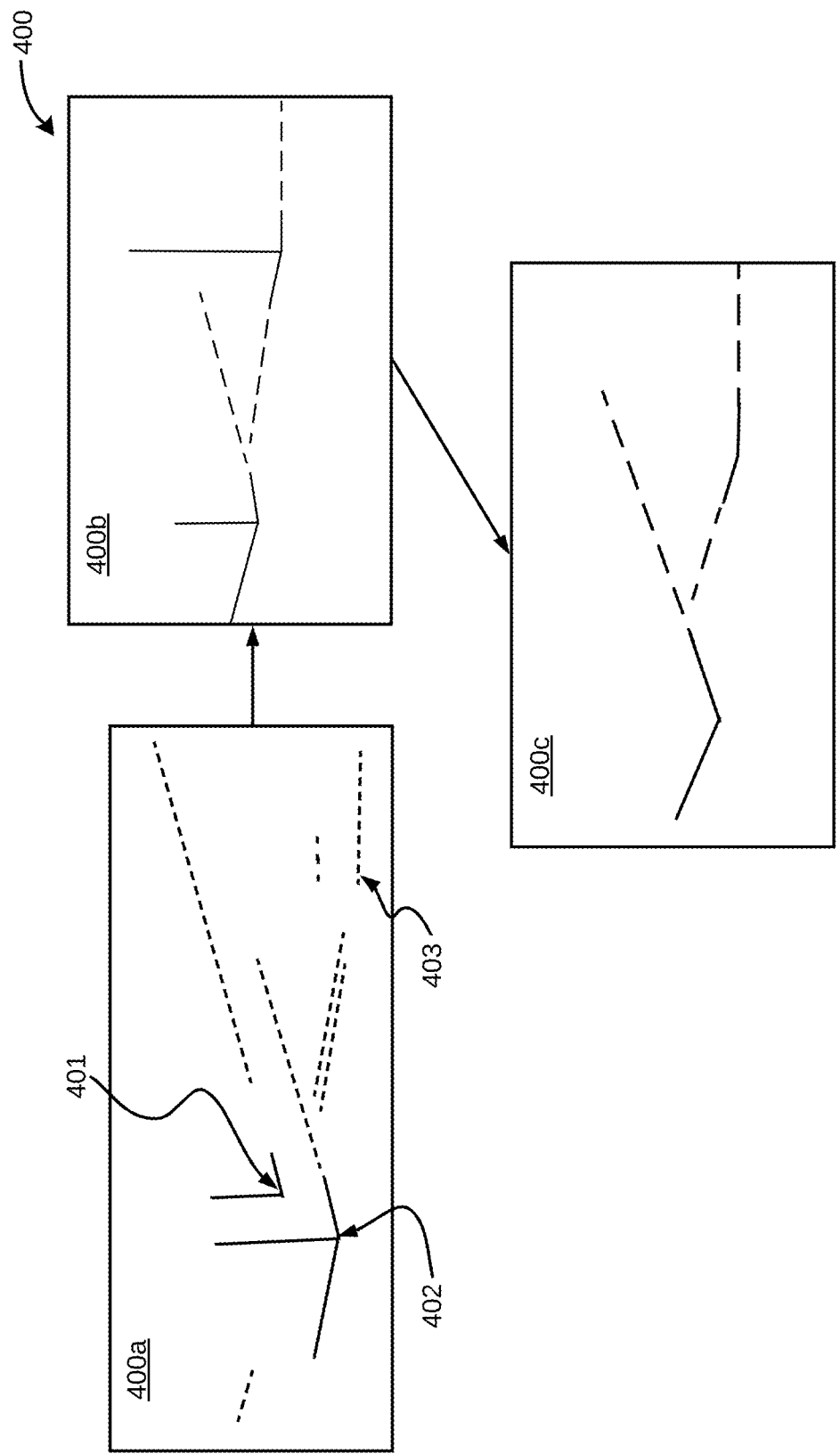
FIG. 4 depicts an exemplary methodology for determining ground-touching corner edges, in accordance with some embodiments of the present disclosure.

Referring now to FIG. 4, an exemplary methodology 400 for determining ground-touching corner edges is depicted, in accordance with some embodiments of the present disclosure. It is shown in the line drawing 400a that a set of horizontal edges from the plurality of corner edges may be extended away from an associated corner point till each of the set of horizontal edges touches one of the horizontal edge or the vertical edge. In some embodiments, the bottom most line may be considered as a ground touching line. It should be noted that, for any given corner edge, upon determining a presence of a horizontal edge of another corner edge below an associated vertical edge of the given corner edge, the corner edge may be discarded. From the line drawings 400a, it is observed that corner edge 401 does not have any real horizontal edge below but has an extended horizontal edge corresponding to another corner edge 402. Thus, the vertical/horizontal line corresponding to the corner edge 401 may be discarded. In a similar fashion, except two horizontal edges corresponding to each of the corner edges 402 and 403, all other horizontal edges are discarded, as shown in line drawings 400b and 400c. There may be a probability that the horizontal edge corresponding to corner edge 401 is a window edge, a ceiling edge or any other edge except the ground touching edge.

Figure 5:
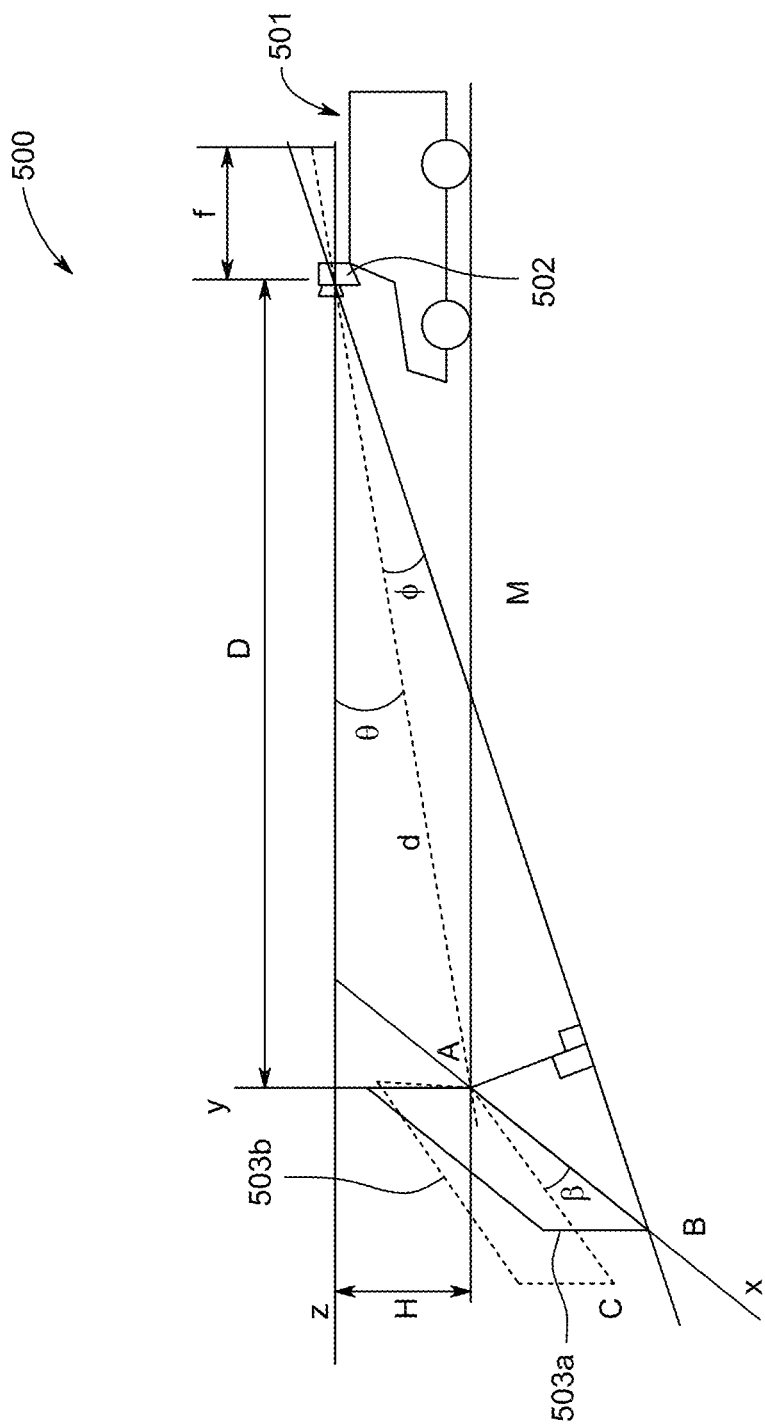
FIG. 5 depicts an exemplary methodology for camera scene calibration, in accordance with some embodiments of the present disclosure.

Referring now to FIG. 5, an exemplary methodology 500 for camera scene calibration is depicted, in accordance with some embodiments of the present disclosure. The system 500 comprises an AGV 501, a camera 502 mounted on the AGV 501, and a calibration board 503. An initial position 503a of the calibration board may be represented as 'AB' in the FIG. 5. After rotating the calibration board at some beta angle, another position 503b of the calibration board is represented by 'AC'. The angle '13' is a rotational angle for the calibration board 503. The calibration board 503 may be rotated at different angles by varying the value of 'β'. It should be noted that the angle 'β' may lie in between a range of 0 to 90 degree.

Here, 'Z' is representing distance of the vehicle from the calibration board, 'x' and 'y' are two planes, 'D' is distance of the calibration board 503 from the camera 502 and 'H' is height of the calibration board 503. These parameters may be utilized to determine the line equation (1). The calibration board 503 is rotated at different angles to calibrate the camera 502 to observe camera scenes for different situations. It should be noted that when the calibration board is rotated between zero to ninety degree, the angle of rotation for the camera scene may be different and it may vary from a particular angle to ninety degree. The equation of rotated ground touching line 'AC' of the calibration board in camera world at 'D' distance from camera position 503a is already explained at step 205 of FIG. 2.

Figure 6A:
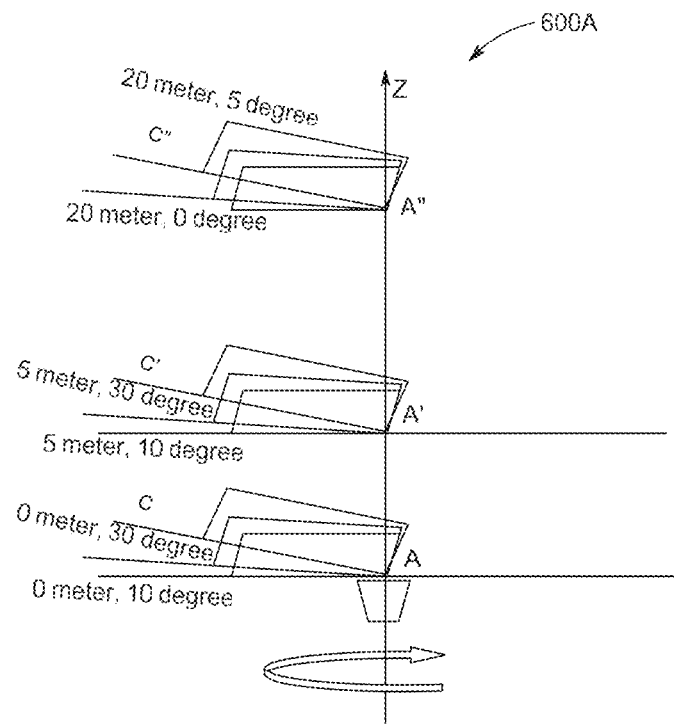
FIGS. 6A-6B depict exemplary placements of calibration board at different distances and at different angles and corresponding camera scene view, in accordance with some embodiments of the present disclosure.
Figure 6B:
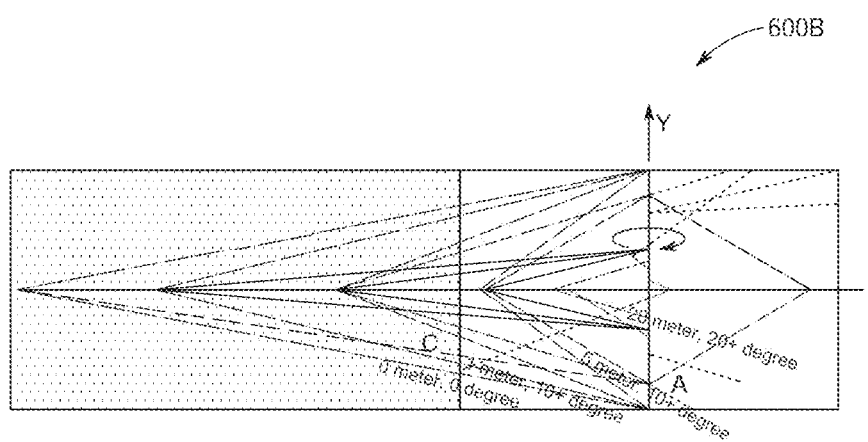
Figure 6C:
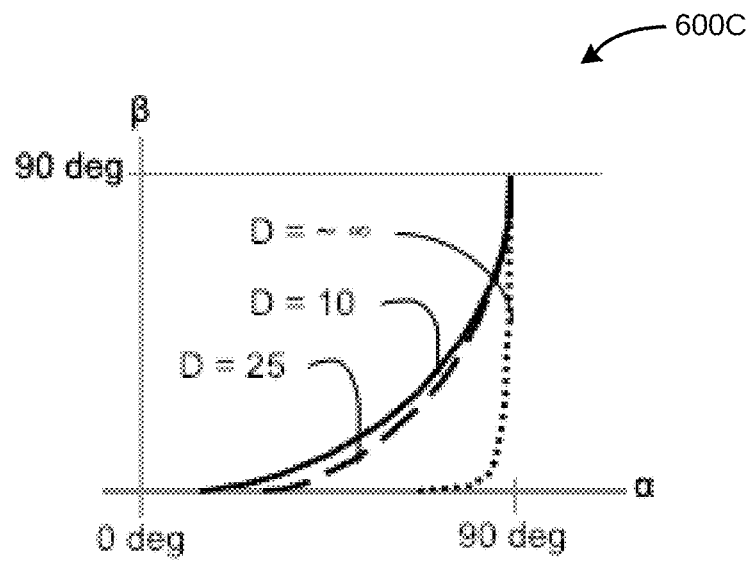
FIG. 6C is a graph depicting a relationship between an angular orientation of a ground touching edge of an object in real-world and an angular orientation of a corresponding ground touching edge in camera scene, at any given distance, in accordance with some embodiments of the present disclosure.

Referring now to FIGS. 6A-6B, exemplary placements 600A of calibration board at different distances and at different angles, and corresponding camera scene 600B view is depicted, in accordance with some embodiments of the present disclosure. In FIG. 6A, top views 600A for the calibration board placed at different distances and at different angles is depicted. By way of an example, three different positions (AC), (A'C'), and (A"C") of the calibration board 503 are considered. For representation of the position (AC), a solid line may be used. Similarly, the position (A'C') and (A"C"), a dash line and a round dot line may be used, respectively. For the position (AC) the calibration board 503 is kept at a distance 0 meter from the camera 502 and rotated between angle 10 degree and 30 degree. Similarly, for the other two positions (A'C') and (A"C"), the calibration board 503 may be placed at 5-meter distance with a rotation of 10-30 degree and 20-meter distance with a rotation of 0-5 degree, respectively. It should be noted that the calibration board may be rotated at an angle 'β' selected from a range of 0-90 degree, for each value of the distance Z. In FIG. 6B, camera scene views 600B corresponding to various placements of the calibration board 503 is depicted. The variation in the camera scene 'a' corresponds to the angle 'β' for a given distance D (one sample value of Z) of the calibration board from the camera. As stated above, the calibration board 503 may be placed at different distances and at different angles in order to derivate a relationship between an angular orientation of a ground touching edge of an object in 3D real-world and an angular orientation of a corresponding ground touching edge in camera scene, at any given distance. Thus, based on the observations and measurements from the collected data, a graph may be plotted between alpha ('α') and beta ('β'). Referring now to FIG. 6C, the relationship between the angle beta ('β') in the real-world and the angle alpha ('α') in the camera scene at any given distance D is depicted, via a graph, in accordance with some embodiments of the present disclosure. Further, based on the graph a mapping relationship given by an equation, such as equation (2), may be derived. As will be appreciated, based the mapping relationship and standard camera equations for 2D to 3D transformation, 3D points corresponding to the 2D points in the 2D camera scene may be determined.

Figures 7A, 7B:
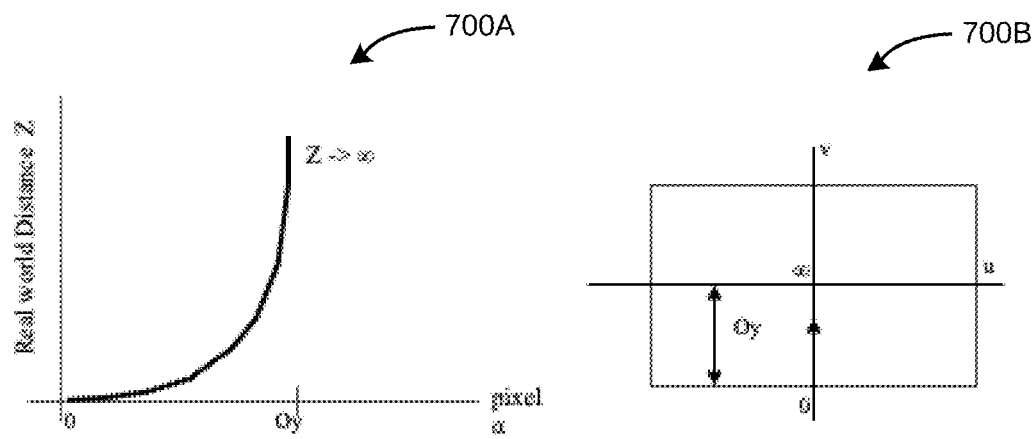
FIG. 7A-7C depicts an exemplary methodology for generating 3D points from 2D points, in accordance with some embodiments of the present disclosure.
Figure 7C:
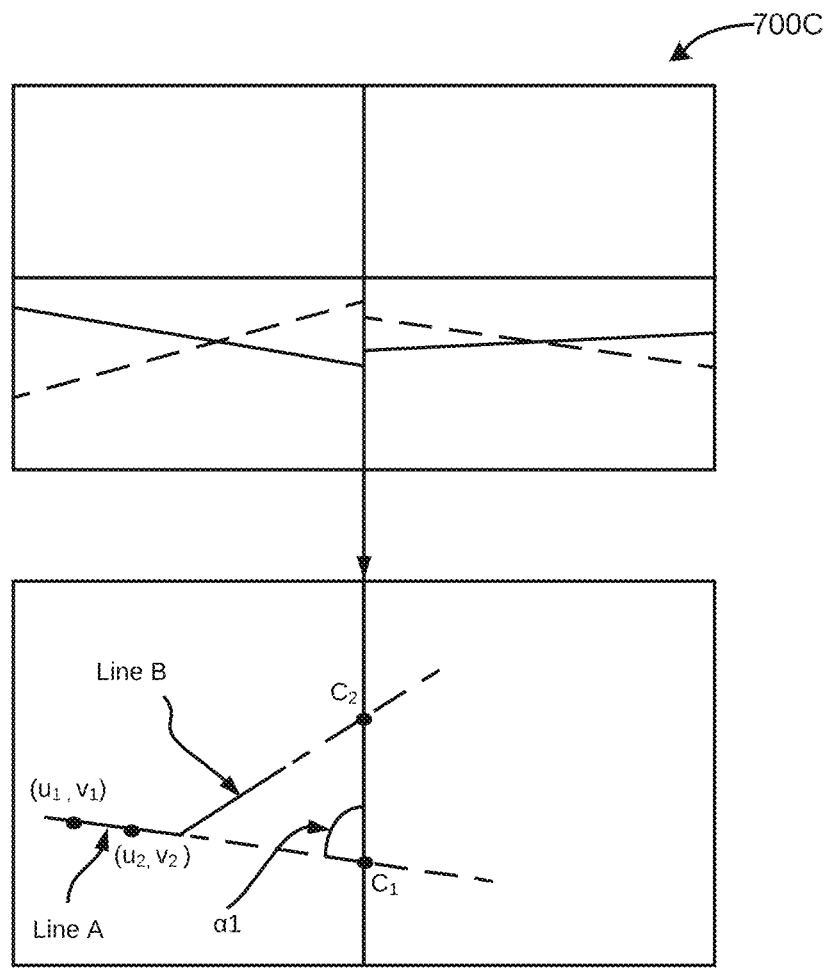

Referring now to FIGS. 7A-7C, an exemplary methodology for generating 3D points (real-world coordinates) from 2D points (camera scene pixels) is depicted, in accordance with some embodiments of the present disclosure. FIGS. 7A and 7B depict the relationship between 'Z' (i.e., real world distance) and 'v' (i.e., pixel position) as given by equations (7) and (8) described at step 206 of FIG. 2. It should be noted that each value of Z may correspond to value of 'D'. Further, FIG. 7C depicts the methodology 700C to generate 3D points (real-world coordinates) from 2D points (camera scene pixels). Initially, (u, v) set of two points on the line 'A' may be determined. For example, as depicted in FIG. 7C, these two points of a processed image scene may be determined as $(u_1, v_1)$ and $(u_2, v_2)$. Further, an angle '$\alpha_1$' & point '$C_1$' corresponding to the line 'A', as depicted in FIG. 7C. The angle '$\alpha_1$' and point '$C_1$' may be determined as per equation (9) given below:

$$v = k \times u + C \quad \text{Equation (9)}$$

where, $\tan(\alpha) = k = ((v2-v1)/(u2-u1))$. Now, D (i.e., Z value) may be determined by putting v=C1 in equation (7) and u=0 in equation (8). Further, real world point (i.e., 'X', 'Y', and 'Z') may be determined from camera scene point (i.e., 'u', and 'v') using equation (4). Thus, following steps may be executed:

a) Obtain the intrinsic camera parameters, in the form of matrix K;
b) find the inverse of K; and
c) apply equation (5) and equation (6) with known Z (D values) as depth.

Figure 8:
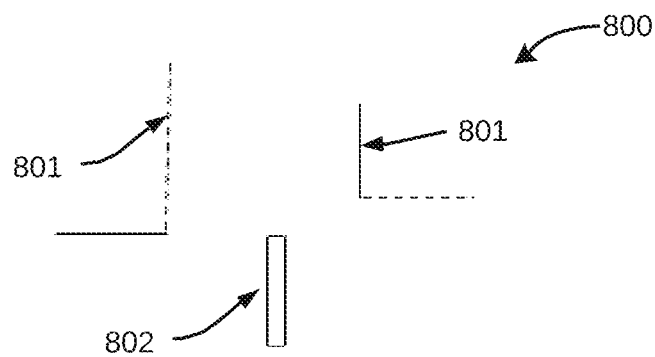
FIG. 8 depicts an exemplary methodology for localizing an AGV using 2D occupancy data, in accordance with some embodiments of the present disclosure.

Afterwards, a value of '$\beta$' (say $\beta_1$) using equation (2) may be determined, as the values of '$\alpha_1$' & 'Z' are already evaluated for line 'A'. Similarly, '$\beta$' and 'D' (Z value) for intersecting line 'B' may also be determined in the camera world. An intersection point of these two real world lines 'A' and 'B' (defined by '$\beta$', 'D') may be determined using equation (1). After determining the intersection point, $(X_0, Z_0)$ of intersecting point on real world may be determined. Now starting from $(X_0, Z_0)$, few other values of X and Z along each of the lines from equation (2) may be determined, by varying X or Z a little bit in right direction. Finally, these points may be plotted on a 2D plane occupancy data. Referring now to FIG. 8, an exemplary methodology 800 for localizing an AGV 802 (analogous to the AGV 501 of FIG. 5) using 2D occupancy data 801 is depicted, in accordance with some embodiments of the present disclosure.

Figure 9:
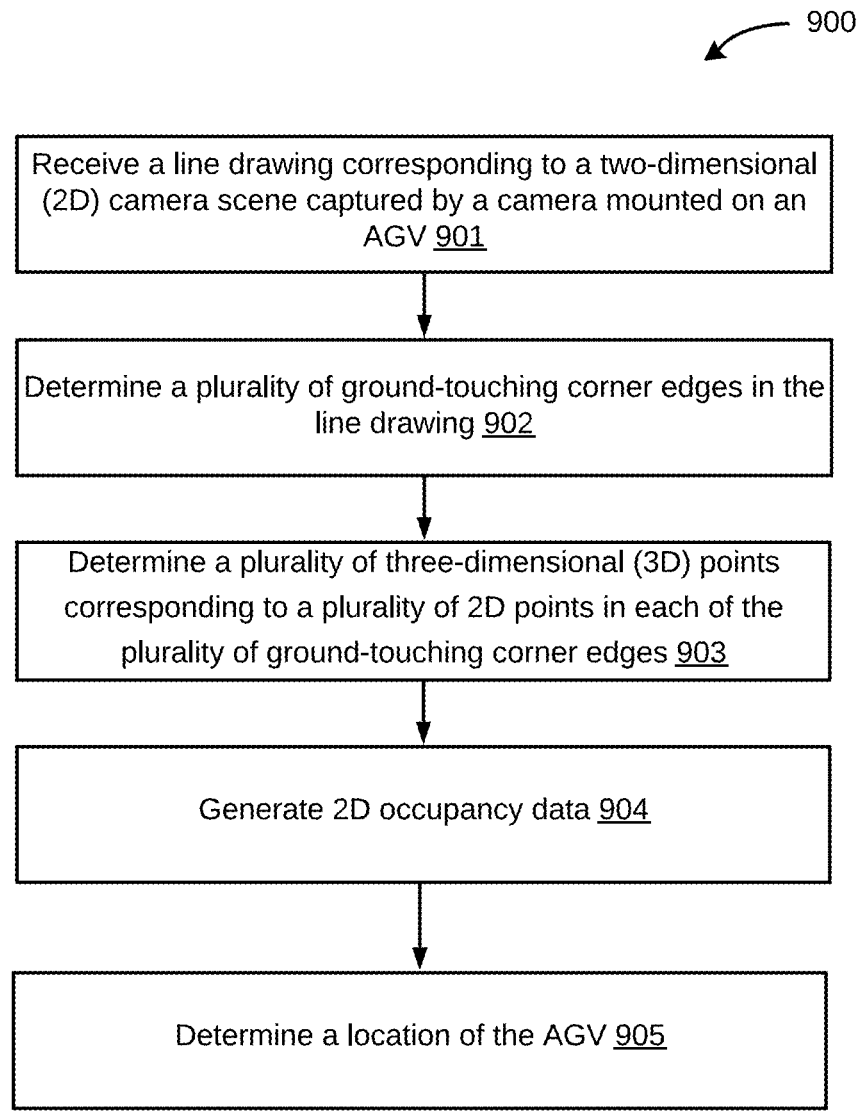
FIG. 9 is a flow diagram of an exemplary process for localizing an AGV, in accordance with some embodiments of the present disclosure.

Referring now to FIG. 9, an exemplary process 900 for localizing an AGV 501 is depicted via a flowchart, in accordance with some embodiments of the present disclosure. All the steps of the process 900 may be performed by the localization device 104. At step 901, a line drawing corresponding to a two-dimensional (2D) camera scene may be received. It should be noted that the 2D camera scene may be captured by a camera 502 mounted on the AGV 501. In some embodiments, the 2D camera scene may correspond to one of a building, a wall, or a foot path. In some embodiments, after the 2D camera scene is captured by the camera 502, the 2D camera scene may be processed by any image processing application to generate the line drawing.

Further, in some embodiments, the 2D camera scenes corresponding to different placements of a calibration board in a real-world may be calibrated to derive a mapping relationship. It should be noted that the mapping relationship provides a relationship between an angular orientation of a ground touching edge of an object in real-world and an angular orientation of a corresponding ground touching edge in camera scene, at any given distance. In some embodiments, the camera scenes may be calibrated using a calibration board 503 so as to derive the mapping relationship. In particular, ground touching corner edge of the 2D camera scenes may be calibrated with corresponding 3D points of the calibration board in the real world. For the camera scene calibration, the calibration board 503 may be placed perpendicularly to a ground at a set of pre-defined distances from the AGV 502 and at a set of pre-defined angles for each of the set of pre-defined distances. Further, a set of measurements of ground touching line orientations and the corresponding 2D camera scene may be made, for each placing of the calibration board in the real-world. Further, the mapping relationship may be determined, based on the set of measurements. It should be noted that, in some embodiments, the mapping relationship is derived by calibrating the camera scene at a periodic interval or based on a user evaluation in a workshop environment. Further, it should be noted that the camera scene may be initially calibrated in a factory environment.

At step 902, a plurality of ground-touching corner edges may be determined. In some embodiments, the plurality of ground-touching corner edges may be determined based on a plurality of horizontal edges and a plurality of vertical edges in the line drawing as per steps below. First, a plurality of corner edges in the line drawing may be determined based on a plurality of intersections between the plurality of horizontal edges and the plurality of vertical edges. Further, for each of the plurality of corner edges, a set of associated horizontal edges may be extended away from an associated corner point till each of the set of associated horizontal edges touches one of the plurality of horizontal edges or one of the plurality of vertical edges. Further, for each of the plurality of corner edges, a corner edge may be discarded upon determining a presence of a horizontal edge of another corner edge below an associated vertical edge of the corner edge.

At step 903, a plurality of 3D points corresponding to a plurality of 2D points may be determined in each of the plurality of ground-touching corner edges. In some embodiments, the mapping relationship and a set of intrinsic parameters of the camera 502 may be used to determine the plurality of 3D points. In some embodiments, the plurality of 3D points may be determined by determining a depth of each of the plurality of 2D points in each of the plurality of ground-touching corner edges based on the mapping relationship and the set of intrinsic parameters of the camera 502.

At step 904, 2D occupancy data may be generated. It should be noted that the plurality of 3D points may be plotted in a 2D plane in order to generate the 2D occupancy data. Further, at step 905, a location of the AGV 501 may be determined based on the 2D occupancy data and the mapping relationship. In some embodiment, a particle filter localization algorithm may be employed to determine the location of the AGV 501.

The present disclosure provides a camera-based approach for distance measure of the visible environmental content, selectively. This disclosure proposes a method of preparing a distance chart of ground touching walls or edges at a plurality of distances and different orientations. The camera scenes captured by the camera 502 mounted on the autonomous vehicle 501 may be calibrated for distance chart preparation. In some embodiments, navigation time camera scenes may be mapped with the distance chart to determine coordinate position of ground touching edges.

The system and method described in the present disclosure uses a common HD map, for localization of the AGV 501, that is generally used by the conventional localization methods using Lidar sensor or any other sensor. Hence, there is no need to prepare any additional or specific map. Further, the system and method described in the present disclosure employs a camera 502, a low-cost vision sensor, for localization. Additionally, the camera calibration may be performed prior to its use in localization process in order to get effective and quick results with low cost camera 502.

Figure 10:
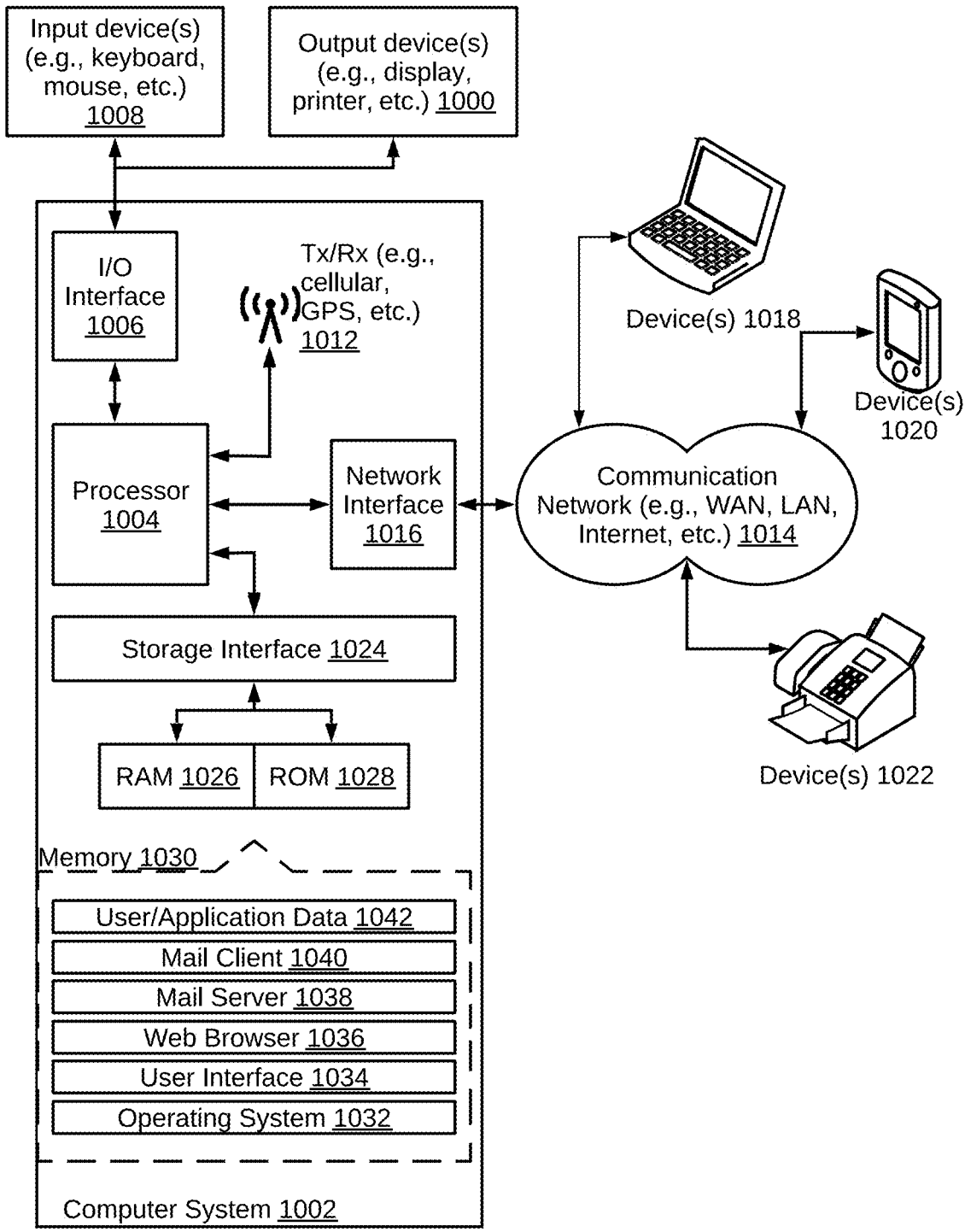
FIG. 10 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 10, a block diagram of an exemplary computer system 1002 for implementing various embodiments is illustrated. Computer system 1002 may include a central processing unit ("CPU" or "processor") 1004. Processor 1004 may include at least one data processor for executing program components for executing user or system-generated requests. A user may include a person, a person using a device such as those included in this disclosure, or such a device itself. Processor 1004 may include specialized processing units such as integrated system (bus) controllers, memory management control units, floating point units, graphics processing units, digital signal processing units, etc. Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1004 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1004 may be disposed in communication with one or more input/output (I/O) devices via an I/O interface 1006. I/O interface 1006 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1006, computer system 1002 may communicate with one or more I/O devices. For example, an input device 1008 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1010 may be a printer, fax machine, video display (for example, cathode ray tube (CRT), liquid crystal display (LCD), light-emitting diode (LED), plasma, or the like), audio speaker, etc. In some embodiments, a transceiver 1012 may be disposed in connection with processor 1004. Transceiver 1012 may facilitate various types of wireless transmission or reception. For example, transceiver 1012 may include an antenna operatively connected to a transceiver chip (for example, TEXAS® INSTRUMENTS WILINK WL1283® transceiver, BROADCOM® BCM45501UB8® transceiver, INFINEON TECHNOLOGIES® X-GOLD 918-PMB9800® transceiver, or the like), providing IEEE 802.11a/b/g/n, Bluetooth, FM, global positioning system (GPS), 2G/3G HSDPA/HSUPA communications, etc.

In some embodiments, processor 1004 may be disposed in communication with a communication network 1014 via a network interface 1016. Network interface 1016 may communicate with communication network 1014. Network interface 1016 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 1014 may include, without limitation, a direct interconnection, local area network (LAN), wide area network (WAN), wireless network (for example, using Wireless Application Protocol), the Internet, etc. Using network interface 1016 and communication network 1014, computer system 1002 may communicate with devices 1018, 1020, and 1022. These devices 1018, 1020, and 1022 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1002 may itself embody one or more of these devices 1018, 1020, and 1022.

In some embodiments, processor 1004 may be disposed in communication with one or more memory devices (for example, RAM 1026, ROM 1028, etc.) via a storage interface 1024. Storage interface 1024 may connect to memory 1030 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1030 may store a collection of programs or data store components, including, without limitation, an operating system 1032, user interface application 1034, web browser 1036, mail server 1038, mail client 1040, user/application data 1042 (for example, any data variables or data records discussed in this disclosure), etc. Operating system 1032 may facilitate resource management and operation of computer system 1002. Examples of operating systems 1032 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT®

WINDOWS® platform (XP, Vista/7/8, etc.), APPLE® 10S® platform, GOOGLE® ANDROID® platform, BLACKBERRY® OS platform, or the like. User interface 1034 may facilitate display, execution, interaction, manipulation, or operation of program components through textual or graphical facilities. For example, user interfaces 1034 may provide computer interaction interface elements on a display system operatively connected to computer system 1002, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1002 may implement a web browser 1036 stored program component. Web browser 1036 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers 936 may utilize facilities such as AJAX, DHTML, ADOBE® FLASH® platform, JAVASCRIPT® programming language, JAVA® programming language, application programming interfaces (APis), etc. In some embodiments, computer system 1002 may implement a mail server 1038 stored program component. Mail server 1038 may be an Internet mail server such as MICROSOFT® EXCHANGE® mail server, or the like. Mail server 1038 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1038 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1002 may implement a mail client 1040 stored program component. Mail client 1040 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1002 may store user/application data 1042, such as the data, variables, records, etc. as described in this disclosure. Such databases may be implemented as fault-tolerant, relational, scalable, secure databases such as ORACLE® database or SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The techniques described in various embodiments discussed above provide for efficient and cost-effective process for localizing AGV. In particular, the techniques described above may employ low cost vision sensor (e.g., camera) mounted on the AGV for performing localization of the AGV. Further, the techniques provide for a prior camera scene calibration method of pre-stacking possible coordinate points, thereby reducing runtime processing effort. The techniques may further provide for adjusting direction for AGV's next move. The AGV may rely on vector maps and path generated out of the waypoints.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described method and system for localizing an AGV. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of localizing an autonomous ground vehicle (AGV), the method comprising:

receiving, by a localization device, a line drawing corresponding to a two-dimensional (2D) camera scene, wherein the 2D camera scene is captured by a camera mounted on the AGV;

determining, by the localization device, a plurality of ground-touching corner edges based on a plurality of horizontal edges and a plurality of vertical edges in the line drawing;

determining, by the localization device, a plurality of 3D points corresponding to a plurality of 2D points in each of the plurality of ground-touching corner edges based on a mapping relationship and a set of intrinsic parameters of the camera, wherein the mapping relationship is derived by calibrating 2D camera scenes corresponding to different placements of a calibration board in a real-world, and wherein the mapping relationship provides a relationship between an angular orientation of a ground touching edge of an object in real-world and an angular orientation of a corresponding ground touching edge in camera scene, at any given distance;

generating, by the localization device, 2D occupancy data by plotting the plurality of 3D points in a 2D plane; and determining, by the localization device, a location of the AGV based on the 2D occupancy data and the mapping relationship.

2. The method of claim 1, wherein determining the plurality of ground-touching corner edges comprises:

determining a plurality of corner edges in the line drawing based on a plurality of intersections between the plurality of horizontal edges and the plurality of vertical edges; and for each of the plurality of corner edges,
extending a set of associated horizontal edges away from an associated corner point till each of the set of associated horizontal edges touches one of the plurality of horizontal edges or one of the plurality of vertical edges; and
discarding a corner edge upon determining a presence of a horizontal edge of another corner edge below an associated vertical edge of the corner edge.

3. The method of claim 1, further comprising deriving the mapping relationship by calibrating ground touching corner edge of the 2D camera scenes with corresponding 3D points of the calibration board in the real world, and wherein calibrating comprises:

placing the calibration board perpendicularly to a ground at a set of pre-defined distances from the AGV and at a set of pre-defined angles for each of the set of pre-defined distances;

making a set of measurements of ground touching line orientations for each placing in the real-world and the corresponding 2D camera scene; and determining the mapping relationship based on the set of measurements.

4. The method of claim 1, further comprising:
receiving the 2D camera scene corresponding to one of a building, a wall, or a foot path; and
processing the 2D camera scene to generate the line drawing.

5. The method of claim 1, wherein the mapping relationship is derived by calibrating at a periodic interval or based on a user evaluation in a factory environment or in a workshop environment.

6. The method of claim 1, wherein determining the plurality of 3D points comprises determining a depth of each of the plurality of 2D points in each of the plurality of ground-touching corner edges based on the mapping relationship and the set of intrinsic parameters of the camera.

7. The method of claim 1, wherein determining the location of the AGV comprises applying a particle filter localization algorithm.

8. A system for localizing an autonomous ground vehicle (AGV), the system comprising:
a processor; and
a memory communicatively coupled to the processor, wherein the memory stores processor-executable instructions, which, on execution, causes the processor to:
receive a line drawing corresponding to a two-dimensional (2D) camera scene, wherein the 2D camera scene is captured by a camera mounted on the AGV;
determine a plurality of ground-touching corner edges based on a plurality of horizontal edges and a plurality of vertical edges in the line drawing;
determine a plurality of 3D points corresponding to a plurality of 2D points in each of the plurality of ground-touching corner edges based on a mapping relationship and a set of intrinsic parameters of the camera, wherein the mapping relationship is derived by calibrating 2D camera scenes corresponding to different placements of a calibration board in a real-world, and wherein the mapping relationship provides a relationship between an angular orientation of a ground touching edge of an object in real-world and an angular orientation of a corresponding ground touching edge in camera scene, at any given distance;
generate 2D occupancy data by plotting the plurality of 3D points in a 2D plane; and
determine a location of the AGV based on the 2D occupancy data and the mapping relationship.

9. The system of claim 8, wherein the processor determines the plurality of ground-touching corner edges by:
determining a plurality of corner edges in the line drawing based on a plurality of intersections between the plurality of horizontal edges and the plurality of vertical edges; and
for each of the plurality of corner edges,
extending a set of associated horizontal edges away from an associated corner point till each of the set of associated horizontal edges touches one of the plurality of horizontal edges or one of the plurality of vertical edges; and
discarding a corner edge upon determining a presence of a horizontal edge of another corner edge below an associated vertical edge of the corner edge.

10. The system of claim 8, wherein the processor derives the mapping relationship by calibrating ground touching corner edge of the 2D camera scenes with corresponding 3D points of the calibration board in the real world, and wherein calibrating comprises:
placing the calibration board perpendicularly to a ground at a set of pre-defined distances from the AGV and at a set of pre-defined angles for each of the set of pre-defined distances;
making a set of measurements of ground touching line orientation for each placing in the real-world and the corresponding 2D camera scene; and
determining the mapping relationship based on the set of measurements.

11. The system of claim 8, wherein the processor-executable instructions, on execution, further cause the processor to:

receive the 2D camera scene corresponding to one of a building, a wall, or a foot path; and process the 2D camera scene to generate the line drawing.

12. The system of claim 8, wherein the mapping relationship is derived by calibrating at a periodic interval or based on a user evaluation.

13. The system of claim 8, wherein the processor determines the plurality of 3D points by determining a depth of each of the plurality of 2D points in each of the plurality of ground-touching corner edges based on the mapping relationship and the set of intrinsic parameters of the camera.

14. The system of claim 8, wherein the processor determines the location of the AGV by applying a particle filter localization algorithm.

15. A non-transitory computer-readable medium storing computer-executable instructions for:

receiving a line drawing corresponding to a two-dimensional (2D) camera scene, wherein the 2D camera scene is captured by a camera mounted on the AGV;

determining a plurality of ground-touching corner edges based on a plurality of horizontal edges and a plurality of vertical edges in the line drawing;

determining a plurality of three-dimensional (3D) points corresponding to a plurality of 2D points in each of the plurality of ground-touching corner edges based on a mapping relationship and a set of intrinsic parameters of the camera, wherein the mapping relationship is derived by calibrating 2D camera scenes corresponding to different placements of a calibration board in a real-world, and wherein the mapping relationship provides a relationship between an angular orientation of a ground touching edge of an object in real-world and an angular orientation of a corresponding ground touching edge in camera scene, at any given distance;

generating 2D occupancy data by plotting the plurality of 3D points in a 2D plane; and determining a location of the AGV based on the 2D occupancy data and the mapping relationship.

16. The non-transitory computer-readable medium of claim 15, wherein determining the plurality of ground-touching corner edges comprises:

determining a plurality of corner edges in the line drawing based on a plurality of intersections between the plurality of horizontal edges and the plurality of vertical edges; and for each of the plurality of corner edges, extending a set of associated horizontal edges away from an associated corner point till each of the set of associated horizontal edges touches one of the plurality of horizontal edges or one of the plurality of vertical edges; and discarding a corner edge upon determining a presence of a horizontal edge of another corner edge below an associated vertical edge of the corner edge.

17. The non-transitory computer-readable medium of claim 15, further comprising computer-executable instructions for deriving the mapping relationship by calibrating ground touching corner edge of the 2D camera scenes with corresponding 3D points of the calibration board in the real world, wherein calibrating comprises:

placing the calibration board perpendicularly to a ground at a set of pre-defined distances from the AGV and at a set of pre-defined angles for each of the set of pre-defined distances;

making a set of measurements of ground touching line orientation for each placing in the real-world and the corresponding camera scene; and determining the mapping relationship based on the set of measurements.

18. The non-transitory computer-readable medium of claim 15, further comprising computer-executable instructions for:

receiving the 2D camera scene corresponding to one of a building, a wall, or a foot path; and processing the 2D camera scene to generate the line drawing.

19. The non-transitory computer-readable medium of claim 15, wherein determining the plurality of 3D points comprises determining a depth of each of the plurality of 2D points in each of the plurality of ground-touching corner edges based on the mapping relationship and the set of intrinsic parameters of the camera.

20. The non-transitory computer-readable medium of claim 15, wherein determining the location of the AGV comprises applying a particle filter localization algorithm.

* * * * *